Figure 1:
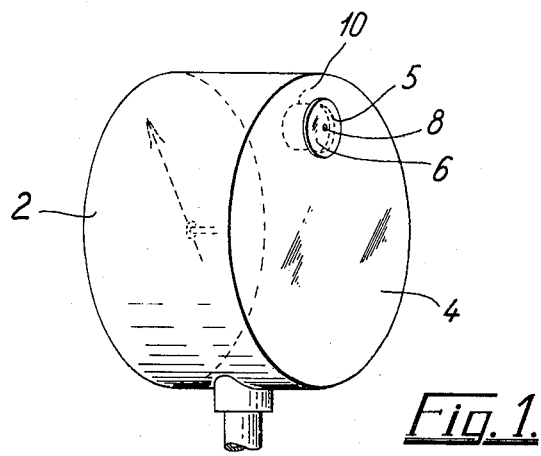

United States Patent [19]
Mogensen et al.

[11] 3,938,393
[45] Feb. 17, 1976

[54] MEASURING INSTRUMENTS
[75] Inventors: Rasmus Langballe Mogensen, Aarhus V; Hans Erik Sallerup, Viby J., both of Denmark
[73] Assignee: Tempress A/S, Viby J., Denmark
[22] Filed: Dec. 24, 1974
[21] Appl. No.: 536,241

[30] Foreign Application Priority Data
  Dec. 28, 1973  United Kingdom............... 60066/73

[52] U.S. Cl..................................... 73/431; 73/416
[51] Int. Cl.²..................... G01P 1/02; G01L 19/14
[58] Field of Search ................. 73/416, 431; 137/60; 220/85 B, 89 A

[56] References Cited
UNITED STATES PATENTS
3,177,722  4/1965  Huston................................. 73/416

Primary Examiner—Donald O. Woodiel
Attorney, Agent, or Firm—William Anthony Drucker

[57] ABSTRACT

A measuring instrument such as a manometer adapted to be mounted in a fluid pressure system and having a rigid, generally closed instrument casing, the rear wall of which is provided with an opening in which there is inserted a blow out security element which is combined with a deformable bellow member extending into the casing so as to be able to accomodate thermal expansion and contraction of the gas or liquid enclosed within the casing, the interior of the bellow being connected to the atmosphere through a passage in the outer portion of said blow out security element. Further, as a separate sales article for mounting in an opening in the casing wall of an already existing measuring instrument, an insert unit made as a blow out element having integrally or disintegrally associated therewith a bellow member operable to be inserted through said opening when the insert unit is mounted in the opening.

6 Claims, 3 Drawing Figures

MEASURING INSTRUMENTS

The present invention relates to a measuring instrument such as a liquid filled manometer, comprising a rigid casing having an opening in a wall portion thereof and a security plate or stopper member sealingly inserted in said opening so as to be able to be blown out from the opening by an excessive overpressure inside said instrument casing, while inside the casing there is mounted a bellow member, the interior of which is connected to the atmosphere outside the casing through a vent hole in the wall of the casing. Normally the instrument casing is made as a metal bowl member closed by a front glass and containing a scale plate, a pointer, and a measuring system for moving the pointer in accordance with the value to be measured. Especially manometers, but sometimes even other kinds of measuring instruments such as thermometers, are connected to pressure sources without, of course, the pressure getting access to the casing of the instrument. In manometers the pressure sensitive measuring system normally comprises a so-called Bourdon tube which is an arched tube of oval cross section, closed at one end and at its other end connected to a connector tube stud extending through the wall of the casing, when the tube stud is connected to a pressure pipe the internal pressure in the Bourdon tube will tend to straighten out this tube, and the resulting deplacement of the closed end thereof is transferred to the pointer, e.g. by means of a rack and pinion arrangement.

It could possibly happen that the Bourdon tube is blown up by a high pressure or breaks for some other reason, whereby the casing of the manometer would be subject to an excessive internal pressure which could cause a rigid and tight casing to explode or the glass thereof to be blasted into the face of a person standing in front of the instrument. Of course the instrument casing should be tight in order to exclude dust from the measuring system, and it has been prescribed, therefore, that for security against such explosions the instrument casings whenever possible should be provided with a rear wall portion which is mounted so as to be able to be blown out by an excessive internal pressure, before the entire casing would explode, this wall portion normally being called a blow out disc or stopper.

Another problem is that if the instrument casing is tight the changes of the temperature would give rise to pressure variations inside the housing, and for avoiding such pressure variations it is customary practice to provide the casing wall with a narrow venting hole through which the air pressure inside and outside the instrument casing will be equalised.

It is desirable, however, to let the instrument casing be entirely filled with a damping and lubricating liquid such as glycerine, and in such instruments, of course, the said narrow hole in the wall of the casing would enable an outflow of the liquid or the vapour thereof. It has been suggested, therefore, to arrange a resiliently deformable bellow member inside the casing, the interior of this bellow member being connected to the said narrow venting hole, whereby the air pressure inside the bellow member and the liquid pressure outside the bellow member will always be equalized. Such an instrument, therefore, should be provided both with said bellow and with said blow out wall portion.

It is the purpose of this invention to provide a measuring instrument of the type referred to, in which the blow out wall portion and the pressure equalizing bellow member are arranged in a simple manner and are easy to mount.

According to the invention the bellow member is mounted in connection with the blow-out disc or stopper, in which the venting hole is provided. In this manner the pressure equalizing bellow is directly associated with the blow out wall portion, and for obtaining the desired result it is sufficient, therefore, to provide the instrument casing with a wide hole and mount therein in a releasable manner an element consisting of a wall portion fitting in the hole and having a venting hole and a bellow member located behind this hole, i.e. a self contained element which is easy to produce and to mount and which obviates e.g. the problem of sealingly connecting a bellow member to a venting hole in the casing wall itself.

Figure 2:
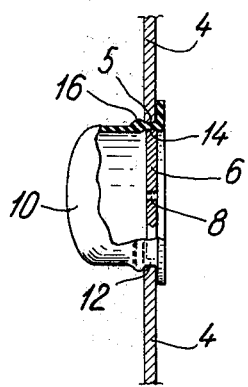
Figure 3:
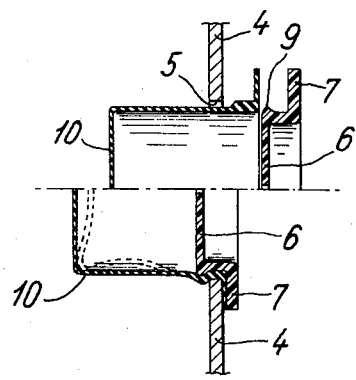

In the following, by way of example, the invention is described in more detail with reference to the accompanying drawing, in which FIG. 1 is a general perspective view of a manometer according to the invention, seen from its rear side, FIG. 2 is a sectional view of the said blow out wall portion and bellow unit, and FIG. 3 is a corresponding view of a preferred embodiment thereof.

In FIG. 1 a manometer 2 is shown from its rear side. In the rear wall 4 of the rigid, bowl-shaped metal casing thereof there is provided a wide hole 5 in which there is inserted a disc member 6 having a narrow hole 8. A bellow member 10 is associated with the interior side of the disc so as to communicate with the atmosphere through the hole 8. The bellow is easily deformable so as to accomodate to the volume variations of the medium filling the manometer casing, preferably a liquid such as glycerine, and the disc 6 is held in the hole 5 so as to be able to be blown out therefrom should a moderate overpressure arise inside the manometer casing.

The disc 6 may be of a semi hard plastics and the bellow 10 may be secured to the disc by welding or otherwise so as to be unitary with the disc 6. However, FIG. 2 shows a preferred arrangement in which the bellow 10 is a separate thin walled cup member of an easily bendable plastics or rubber, the free edge of which is of increased wall thickness and is provided with an exterior annular groove 12 with which the cup member fits loosely in the hole 5. The disc 6 is forced into an interior annular groove or rebate 14 in the cup edge portion, and the diameter of the disc is so adapted that the edge of the disc will urge the relatively soft material of the cup edge sealingly against the edge of the hole 5.

Should an overpressure arise inside the manometer casing the wall of the groove 12 inside the edge of the hole 5 will not be able to hold the bellow member against the pressure, and the entire bellow and disc assembly will get blown out of the hole. The said groove wall portion is designated 16, and it may of course be designed so as to withstand any specified overpressure.

Obviously, the detailed arrangement of the disc and bellow structure can be largely modified within the scope of the invention, depending also on the expected degree of volume variation of the bellow member. The bellow should not necessarily have a cylindric wall portion, i.e. it could be reduced to a membrane-like structure. It will be understood that for the operation of the device it is not imperative that the hole 8 be an expressed narrow hole, since the interior of the instrument is effectively protected by the unbroken bellow or membrane. As shown in FIG. 2 it is advantageous that the soft material of the bellow is used for sealing against the hole in the wall 4, but, of course, other sealing arrangements would be possible.

In a preferred embodiment as shown in FIG. 3 the ring or disc member 6 has an exterior radial flange portion 7, and the outer circumference of the central disc portion has an annular, radially protruding rib 9 which, when the disc is inserted in the front end of the bellow member, causes the bellow wall material to be pressed outwardly behind the edge of the hole in the wall 4, as shown in the lower half of FIG. 3. However, the holding of the bellow and disc unit will have the same releasable character as that described above, and due to the diameter of the bellow member not being larger than that of the hole 5 the unit will be safely blown out in case of an overpressure. If the bellow was thicker than the hole 5 there could be a risk of the bellow not being blown out, but being forced to block the hole and thus jeopardize the safety against explosion of the casing.

Theoretically the disc 6 could cover the entire rear side of the instrument, but it is highly advantageous that the disc and bellow unit occupies a small wall area only, since the remaining rigid wall is then usable as a mounting base for means for supporting the instrument e.g. on an instrument board.

The invention also comprises the unit 6,10 as a separate article for use in connection with already existing instruments, and it should be mentioned that the system according to the invention may be used advantageously also with such instruments which are not liquid filled, and not even capable of producing an excessive overpressure, but in which it is desired to have a tight instrument casing with a compensator for thermal volume variations of the medium inside the casing. The invention according to this aspect thereof provides for a very simple mounting of such a compensator, because it is easily mounted from the outside of the instrument casing and sealed against the edge of the hole 5.

What is claimed is:

1. A measuring instrument comprising a rigid instrument casing having an opening in a wall portion thereof and a security disc or stopper member sealingly inserted in said opening so as to be able to be blown out from the opening by an excessive overpressure inside the casing, said instrument further having a pressure equalizing bellow member located inside the casing and the interior of which is connected to the atmosphere outside the casing through vent hole means in the wall of the casing, characterized in that the bellow member is mounted in connection with the blow out member, the said vent hole means being provided in the blow out member.

2. An instrument according to claim 1, characterized in that the bellow member has an annular edge portion fitting into said wall opening and that the security member is sealingly mounted in the opening with said edge portion of the bellow situated between the edge of the opening and a circumference portion of the security member.

3. An instrument according to claim 1, in which the largest width or diameter of the bellow member is smaller or at least not considerably larger than the diameter of the said wall opening.

4. An insert unit for a measuring instrument according to claim 1, characterized by consisting of a deformable bellow member having a substantially rigid wall portion operable to be received in a sealed, yet retractable manner in an opening in the wall of the instrument casing, and a bellow portion adapted to thereby be situated inside the casing, said rigid wall portion being provided with vent hole means through which the interior of the bellow portion is connected to the atmosphere outside the rigid wall portion.

5. An insert unit according to claim 4, characterized in that the bellow portion and the rigid wall portion thereof are made as separate or disintegral elements.

6. An insert unit according to claim 4, characterized in that the largest diameter of the bellow portion does not substantially exceed the diameter of the said rigid wall portion.

* * * * *